3,431,173
PROCESS FOR THE PREPARATION OF 17α-ACYLOXY-21-HYDROXY-PREGNANES
Willem Frederik van der Waard and Jan de Flines, Delft, Netherlands, assignors to Koninklijke Nederlandsche Gist & Spiritusfabriek N.V., Delft, Netherlands, a corporation of the Netherlands
No Drawing. Filed Apr. 24, 1967, Ser. No. 632,888
Claims priority, application Netherlands, Apr. 25, 1966, 6605515
U.S. Cl. 195—51         5 Claims
Int. Cl. C12b 1/00; C07c 167/00

ABSTRACT OF THE DISCLOSURE

Novel process for the preparation of 17α-acyloxy-21-hydroxy steroids of the pregnane series from the corresponding 17α,21-diacyloxy steroids with *Flavobacterium dehydrogenans* with excellent yields.

PRIOR ART

The preparation of 17α-acyloxy-21-hydroxy compounds of the pregnane series by selective esterification of the corresponding 17α,21-dihydroxy compounds has not been possible because in this process, first the 21-acyloxy compounds and then the 17α,21-diacyloxy compounds are obtained. Nor is selective saponification of 17α,21-diacyloxy compounds of the pregnane series by chemical means possible. With saponification or re-esterification in an alkaline medium, the free alcohols are invariably obtained via the 21-acylates, without a trace of the 17α-monoacylate being formed, while with saponification in an acid medium, a mixture of 21-acylate, 17α-acylate, and free alcohol is always obtained. According to R. Gardi et al. [Gazz. Chim. Ital. 93, 431–450 (1963)], 17α-acyloxy compounds of 17α,21-dihydroxy-20-oxo-steroids of the pregnane series can be obtained via the 17α,21-orthoesters, but this method presents the drawback that the yields of the 17α-acyloxy compound are not particularly good and a mixture of the desired product with the 21-acyloxy compound is always obtained.

OBJECTS OF THE INVENTION

It is an object of the invention to provide a novel, simple process for the preparation of 17α-acyloxy-21-hydroxy steroids of the pregnane series in excellent yields.

It is another object of the invention to provide a process for the preparation of 17α-acyloxy-21-hydroxy steroids of the pregnane series from the corresponding 17α,21-diacyloxy steroids.

These and other objects and advantages of the invention will become obvious from the following detailed description.

THE INVENTION

The process of the invention for the preparation of 17α-acyloxy-21-hydroxy steroids of the pregnane series comprises subjecting a 17α,21-diacyloxy steroid of the pregnane series wherein the acyl radical is derived from an organic carboxylic acid of 1 to 5 carbon atoms to the action of the enzymes from *Flavobacterium dehydrogenans* until the said diacyloxy steroid has been almost completely converted into a 17α-acyloxy-21-hydroxy steroid and recovering the latter.

*Flavobacterium dehydrogenans* was first described by Arnaudi in Boll. Sez. Ital. Soc. Intern. Microbiol. 11 (1939) 208. Later the same author described the strain used by him in detail in Zentralblatt für Bakteriologie, Parasitenkunde und Infektionskrankheiten II. Abt. 105, 352 (1942). In the American Type Culture Collection, the bacterium occurs as *Flavobacterium dehydrogenans* A.T.C.C. 13930–I.M.R.U. 130. In the first publication of Arnaudi, the strain was designate as *Micrococcus dehydrogenans*.

The hydrolysis of esterified hydroxyl groups of steroids with the aid of enzymes from *Flavobacterium dehydrogenans* is already known. It is also known that in this process a $\Delta^5$-3β-acyloxy grouping is converted into a $\Delta^4$-3-oxo grouping. Thus in Zentralblatt für Bakt. etc. loc. cit., Arnaudi describes the conversion of pregnenolone, ($\Delta^5$-pregnene-3β-ol-20-one) into progesterone, ($\Delta^4$-pregnene-3,20-dione), and of dehydro-epiandrosterone, ($\Delta^5$-androstene-3β-ol-17-one), into testosterone, ($\Delta^4$-androstene-17α-ol-3-one) and androstene dione, ($\Delta^4$-androstene-3,17-dione), with the aid of enzymes from *Flavobacterium dehydrogenans*. Other familiar reactions are the conversion of 16α-methyl-$\Delta^5$-pregnene-3β,17α,21-triol-20-one 21 acetate into 16α-methyl-$\Delta^4$-pregnene-17α,21-diol-3,20-dione, (U.S. Patent No. 2,985,563), the hydrolysis of the 21-acetoxy group of $\Delta^{1,5}$-pregnadiene-17α,21-diol-3,11,20-trione 21-acetate and of the corresponding 9α-fluoro compound, the hydrolysis of all the acetoxy groups of 11β,17α,21-triacetoxy-$\Delta^{1,5}$-pregnadiene-3,20-dione and the corresponding 9α-fluoro compound (U.S. Patent No. 2,908,696, and German patent specification 1,097,440), while in the British Patent No. 796,769 the conversion of a $\Delta^5$-pregnene-3β,17α,21-triol-20-one or corresponding esters thereof into $\Delta^4$-pregnene-17α,21-diol-3,20-diones with free hydroxyl groups is described. Simultaneous oxidation and saponification also occur during the reaction described in the German Patent No. 1,060,860, in which $\Delta^5$-pregnene-3β,17α,21-triol-20-one 3,21-diacetate is converted into $\Delta^4$-pregnene-17α,21-diol-3,20-dione. An example of the saponification of 11β- and 17β-acyloxy groups with the aid of enzymes from *Flavobacterium dehydrogenans*, in this case of 17α-methyl-11β,17β-diacetoxy-1,4,6-androstatriene-3-one and of the corresponding $\Delta^{4,6}$-androstadiene compound is mentioned in the U.S. Patent No. 2,899,447.

Finally, it is known from the British Patent No. 963,427 that 3β-hydroxy- or 3β-acyloxy-16-methylene-17α-acetoxy-6-X-5-pregnene-20-ones, containing no acyloxy group in position 21, in which X stands for hydrogen, chlorine, fluorine or methyl, can be converted with the aid of enzymes from *Flavobacterium dehydrogenans* into the corresponding $\Delta^4$-pregnene-3-ones if the reaction is broken off when the formation of the $\Delta^4$-3-oxo system is practically complete, but the saponification of the 17α-acetoxy group has not yet taken place.

Now the striking discovery was made that with 17α,21-diacyloxy compounds it is also possible to keep the 17α-acyloxy group unchanged by interrupting the reaction in good time, but to saponify the 21-acyloxy group along with other acyloxy groups that may be present. Thus, for example, by saponification of the 17α, 21-diacetate of compound S ($\Delta^4$-pregnene-17α,21-diol-3,20-dione) or by saponification and oxidation of 3β,17α,21-triacetoxy-$\Delta^5$-pregnene-20-one, it is possible to prepare the 17α-acetate of compound S in high yields.

The starting materials for the process of the invention are 17α,21-diacyloxy steroids of the pregnane series and may contain the usual substituents and double bonds. For example, the steroids may contain hydroxy, acyloxy or oxo groups in the 3, 11, 16 and/or 20 positions, lower alkyl groups in the 2, 4, 6 and/or 16 positions, halogen atoms such as fluorine, chlorine, bromine, iodine in the 4, 6, 7, 9 or 12 positions, double bonds in 1, 2; 4, 5; 6, 7; 9(11); 15, 16 positions and may be an 18 and/or 19 nor steroid. Also, a heterocyclic ring may be condensed on the steroid, particularly on the A-ring.

Examples of suitable organic acids of 1 to 5 carbon atoms may be derived from an aliphatic, carboxylic acid, such as formic acid, acetic acid, propionic acid, butyric acid, isobutyric acid, valeric acid, isovaleri acid, trimethyl acetic acid.

The 17α,21-diacyloxysteroids to be used as starting products can be obtained by conventional methods, e.g., by esterifying the corresponding dihydroxysteroids in the presence of an acid catalyst, as a result of which any other hydroxyl groups present are also esterified. Thus, for instance, the method described in J. Am. Chem. Soc. 75, 3489–92 (1953) is applied, where the use of acid chlorides or anhydrides with p-toluene-sulfonic acid as an acid catalyst is recommended.

During the incubation of the starting steroid with the enzyme, provision must be made for the pH to be preferably no higher than about 6.5, since otherwise a transesterification of the 17α-acylate into the 21-acylate may occur. The concentration of substratum is chosen as high as possible because this is economically advantageous.

The micro-organism to be used is grown in the conventional way, preferably in a liquid medium with constant aeration by shaking or by stirring while passing air therethrough.

The culture medium preferably contains glucose, saccharose or yeast extract as a source of carbo nor nitrogen, while the addition of salts, such as phosphates and trace elements, may be advantageous.

The steroid is added in the form of a fine crystal suspension or dissolved in a solvent, such as acetone, propylene glycol, or dimethylformamide. It is also possible first to isolate the micro-organism from the culture and to suspend it again in a buffer solution, and to add the substratum to this suspension. Furthermore, it is possible to carry out the conversion of the steroid with the aid of spores of the micro-organism or with an enzyme preparation which has been obtained from a culture of the micro-organism.

It is advantageous to follow the reaction with the aid of thin-layer chromatography or paper chromatography. The incubation takes place at temperatures between 20 and 40° C. during 5–70 hours. As soon as all the substratum has been converted, the culture is extracted with an organic solvent, such as methylene chloride, chloroform, ethyl acetate or methyl-isobutyl-ketone. The extract is concentrated and the product crystallized. By recrystallization, e.g. from acetone, the desired product can be obtained in a purified condition.

The 17α-acyloxy-21-hydroxysteroids of the pregnane series to be prepared according to the invention are valuable products, which can be used as medicines. They show a local antiphlogistic action, which lasts longer than that of the correponding 17α-hydroxy compounds.

In the following examples there are described several preferred embodiments to illustrate the invention. However, it should be understood that the invention is not intended to be limited to the specific embodiments.

Example I.—Preparation of 17α-acetoxy-Δ⁴-pregnene-21-ol-3,20-dione

A culture solution was prepared from 10 g. of yeast extract (Difco), 4.5 g. of $Na_2HPO_4$, 3.4 g. of $KH_2PO_4$, and water up to 1000 ml. After the pH had been adjusted to 6.2 with 2 N sodium hydroxide solution, the mixture was sterilized for 20 minutes at 120° C. The culture solution was then inoculated with a culture of *Flavobacterium dehydrogenans* which had grown on agar (the above medium with 2% of agar), and the mixture was shaken for 32 hours at 30° C. in two shaking flasks with a capacity of 2.1 each on a rotary shaking machine (250 r.p.m.).

To each of ten shaking flasks with a capacity of 2 l. and containing 1 litre of the above described medium, 50 ml. of the inoculation culture prepared as described above was then added. The ten flasks were shaken for 18 hours under the above conditions. Then, 5 gm. of 17α,21-diacetoxy-Δ⁴-pregnene-3,20-dione suspended in 100 ml. of water was added to each of the flasks, after which the culture was adjusted to pH of 6.2 with 0.1 molar phosphate buffer and the incubation was continued in the same way. From paper chromatograms it was determined that after 8 hours, all the substratum had been converted into 17α-acetoxy-Δ⁴-pregnene-21-ol-3,20-dione. The cultures were extracted by vigorous stirring with an equal volume of warm methyl-isobutyl-ketone for 1½ hours. The extract was concentrated under reduced pressure to a small volume and the crystallized product was filtered off, washed with methyl-isobutyl-ketone and dried. The crystalline product thus obtained (39.8 g.) was recrystallized by dissolution in 200 ml. of warm acetone, treatment of the solution with 1 g. of active carbon and evaporation thereof to about 80 ml. to obtain 35.4 g. of pure 17α-acetoxy-Δ⁴-pregnene-21-ol-3,20-dione having a melting point of 203–206° C. and a specific rotation of $[\alpha]_D = +40.8°$ (c.=1% in dioxan)

$E^{1\%}_{1\,cm.}$ at 241 mμ in methanol=432

From the mother liquors another 7.4 g. of the said product was isolated, whereby the yield was increased to 94.8% of the theory.

Example II

An inoculation culture of *Flavobacterium dehydrogenans* was prepared in the same way as described in Example I with which again ten portions of 1 litre of the medium present in ten shaking flasks with a capacity of 2 l. each were inoculated. After 18 hours' growth, 10 g. of 3β,17α,21-triacetoxy-Δ⁵-pregnene-20-one, suspended in 200 cm.³ of water, were added to each of the flasks, after which the pH was adjusted to pH of 6.2 with phosphate buffer and the incubation was continued in the same way. From paper chromatograms, it was determined that after 24 hours all the substratum had been converted into 17α-acetoxy-Δ⁴-pregnene-21-ol-3,20-dione, a very small quantity of Δ⁴-pregnene-17α,21-diol-3,20-dione and traces of impurities.

The cultures were extracted by vigorous stirring with an equal volume of warm methyl-isobutyl-ketone for 1½ hours. The extract was concentrated under reduced pressure to a small volume. The crystallized product was filtered off, washed with methyl-iso-butyl-ketone, and dried to obtain 68.4 g. of product which was recrystallized by dissolution in 300 cm.³ of warm acetone, treatment of the solution with 1 g. of active carbon, and evaporation of the filtrate to about 130 cm.³. In this way, 61.6 g. of pure 17α-acetoxy-Δ⁴-pregnene-21-ol-3,20-dione was obtained, which was identical with the product obtained in Example I. From the mother liquors, another quantity of 12.15 g. of the said product was isolated, whereby the yield was increased to 90.1% of the theory.

Example III.—Preparation of 6α-fluoro-16α-methyl-17α-acetoxy-Δ⁴-pregnene-21-ol-3,20-dione An inoculation culture of *Flavobacterium dehydrogenans* was prepared in the same way as described in Example I. Then 5 ml. of the inoculation culture was transferred to each of two shaking flasks with a capacity of 500 ml. and containing 100 ml. of the above-mentioned medium. The two flasks were shaken for 18 hours under the above-mentioned conditions. Then, 500 mg. of 17α,21-diacetate of 6α-fluoro-16α-methyl-Δ⁴-pregnene-17α,21-diol-3,20-dione, suspended in 10 ml. of water, was added to each of the flasks, after which the culture was adjusted to pH of 6.2 with 0.1 molar phosphate buffer and the incubation was continued in the same way. From paper chromatograms it was determined that after 8 hours all the substratum had been converted. The cultures were extracted by vigorous stirring with an equal volume of warm methyl-isobutyl-ketone for 1½ hours. The extract was evaporated under reduced pressure to a small volume, and the crystallized product was filtered off, washed with methyl-iso-butyl-ketone and dried to obtain 436 mg. of pure 6α-fluoro-16α-methyl-17α-acetoxy- Δ⁴-pregnene-21-ol-3,20-dione having a melting point of 188–190° C.

From the mother liquor another 416 mg. of the said compound were isolated whereby the yield was increased to 93.7% of the theory.

*Analysis.*—Calculated: C, 68.55%; H, 7.91%. Found: C, 68.41%; H, 7.89%.

The starting material, 17α,21-diacetate of 6α-fluoro-16α-methyl-17α,21-dihydroxy-Δ⁴-pregnene - 3,20 - dione, was obtained according to the method described by R. B. Turner, J. Am. Chem. Soc. 75 (1953), 3489, and had the following physical constants: Melting point, 226.5–228.5° C.

$E_{1\ cm.}^{1\%}$ at 236 mμ in methanol = 350

*Elemental analysis.*—Calculated: C, 67.51%; H, 7.62%. Found: C, 67.54%; H, 7.53%.

Infrared spectrum: bands at 1735–1728, 1682, 1668, 1625 and 879 cm.⁻¹. NMR spectrum: Maxima at 0.81, 0.98 (doublet), 1.20, 2.14, 2.17, 4.78 and 6.08 p.p.m.

Various modifications of the process of the invention may be made without departing from the spirit or scope thereof and it is to be understood that the invention is to be limited only as defined in the appended claims.

We claim:

1. A process for the preparation of 17α-acyloxy-21-hydroxy steroids of the pregnane series which comprises subjecting a 17α,21-diacyloxy steroid of the pregnane series wherein the acyl radical is derived from an organic carboxylic acid of 1 to 5 carbon atoms to the action of the enzymes from *Flavobacterium dehydrogenans* until the said diacyloxy steroid has been almost completely converted into a 17α-acyloxy-21-hydroxy steroid and recovering the latter.

2. The process of claim 1 wherein the reaction is effected at a pH not higher than 6.5.

3. The process of claim 1 wherein the 17α,21-diacyloxy steroid is 17α,21-diacetoxy-Δ⁴-pregnene-3,20-dione and the 17α-acyloxy-21-hydroxy steroid is 17α-acetoxy-Δ⁴-pregnene-21-ol-3,20-dione.

4. The process of claim 1 wherein the 17α,21-diacyloxy steroid is 3β,17α,21-triacetoxy-Δ⁵-pregnene-20-one and the 17α-acyloxy-21-hydroxy steroid is 17α-acetoxy-Δ⁴-pregnene-21-ol-3,20-dione.

5. The process of claim 1 wherein the 17α,21-diacyloxy steroid is 6α-fluoro-16α-methyl-17α,21-diacetoxy-Δ⁴-pregnene-3,20-dione and the 17α-acyloxy-21-hydroxy steroid is 6α-fluoro - 16α-methyl-17α-acetoxy-Δ⁴-pregnene-21-ol-3,20-dione.

References Cited

UNITED STATES PATENTS

| | | | |
|---|---|---|---|
| 2,816,121 | 12/1957 | Gould et al. | 195—51 |
| 2,816,902 | 12/1957 | Gould et al. | 195—51 |
| 3,379,745 | 4/1968 | Oliveto et al. | 195—51 |

ALVIN E. TANENHOLTZ, *Primary Examiner.*